(12) United States Patent
Suzuki et al.

(10) Patent No.: US 7,794,097 B2
(45) Date of Patent: Sep. 14, 2010

(54) PLANAR LIGHT SOURCE

(75) Inventors: Osamu Suzuki, Tokyo (JP); Nobuyuki Morita, Tokyo (JP); Kouji Masuda, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 189 days.

(21) Appl. No.: 12/089,052

(22) PCT Filed: Oct. 2, 2006

(86) PCT No.: PCT/JP2006/319689

§ 371 (c)(1),
(2), (4) Date: Jun. 18, 2008

(87) PCT Pub. No.: WO2007/040199

PCT Pub. Date: Apr. 12, 2007

(65) Prior Publication Data

US 2009/0231843 A1    Sep. 17, 2009

(30) Foreign Application Priority Data

Oct. 4, 2005    (JP) .............................. 2005-291078

(51) Int. Cl.
G09F 13/04    (2006.01)
G09F 13/08    (2006.01)

(52) U.S. Cl. ................................. 362/97.2; 362/217.05
(58) Field of Classification Search ................ 362/97.1, 362/97.2, 217.05; 349/64, 67
See application file for complete search history.

(56) References Cited

FOREIGN PATENT DOCUMENTS

JP    2002 122863    4/2002
JP    2003 22701    1/2003

*Primary Examiner*—Jason Moon Han
(74) *Attorney, Agent, or Firm*—Oblon, Spivak, McClelland, Maier & Neustadt, L.L.P.

(57) ABSTRACT

In a planar light source in which a plurality of linear light sources are arranged in parallel between a reflector and a diffuser that are disposed in parallel, and a reflective chevronwise partition plate is provided between adjacent linear light sources, the following conditions are met: $T=(H+Q)/2-D/2$, $\theta<90°-\arctan(Q/L)$, $\theta<\{90°+\arctan(T-Q)/(P/2)\}/2$. A vertical distance from the reflector to a peak section of the chevronwise partition plate is T. A vertical distance from the reflector to a center of a linear light source is Q. A vertical distance from the reflector to the diffuser is H. A horizontal distance from the center of the linear light source to a foot section of the chevronwise partition plate is L. A horizontal distance between the centers of adjacent linear light sources is P. A diameter of the linear light source is D. A foot angle of the chevronwise partition plate is $\theta$.

3 Claims, 2 Drawing Sheets

PLANAR LIGHT SOURCE

TECHNICAL FIELD

The present invention relates to a planar light source used, for example, in a backlight of a liquid crystal display device or in an illuminated signboard.

BACKGROUND ART

Conventionally, as a planar light source used in a backlight of a liquid crystal display device or in an illuminated signboard, there is a planar light source using a three-dimensional light reflection plate made from synthetic resin. As a light reflection plate such as this, for example, a light reflection plate formed as follows is proposed (refer to, for example, Patent Literature 1). In the light reflection plate, a linear bending line that is a perforated line, a pressed ruled line, a half-cut, or the like is formed on a foamed plastic film or sheet that reflects light, and a chevronwise section is formed by the film or sheet being bent along the bending line.

Patent Literature 1: Japanese Patent Laid-open Publication No. 2004-138715

DISCLOSURE OF INVENTION

Problem to be Solved by the Invention

However, the planar light source using the light reflection plate in Patent Literature 1 has room for further improvement regarding enhancement in luminance and reduction in luminance unevenness.

The present invention has been achieved in light of the above-described issues. An object of the present invention is to provide a planar light source using a three-dimensional light reflection plate that achieves high average luminance and little luminance unevenness.

Means for Solving Problem

As a result of keen examination to achieve the above-described object, inventors of the present invention have found that a planar light source having high average luminance and little luminance unevenness can be achieved when, in a planar light source in which linear light sources are arranged between a reflector and a diffuser, and a reflective chevronwise partition plate is provided between adjacent linear light sources, a height and a foot angle of the chevronwise partition plate are appropriately set.

The present invention has been achieved based on the above-described finding. In a planar light source in which a plurality of linear light sources are arranged in parallel between a reflector and a diffuser that are disposed in parallel, and a reflective chevronwise partition plate is provided between adjacent linear light sources such as to project in a shape of a chevron from the reflector, when a vertical distance from the reflector to a peak section of the chevronwise partition plate is T, a vertical distance from the reflector to a center of a linear light source is Q, a vertical distance from the reflector to the diffuser is H, a horizontal distance from the center of the linear light source to a foot section of the chevronwise partition plate is L, a horizontal distance between the centers of adjacent linear light sources is P, a diameter of the linear light source is D, and the foot angle of the chevronwise partition plate is θ, following conditions (1), (2), and (3) are met:

$$T = (H+Q)/2 - D/2 \quad (1)$$

$$\theta < 90° - \arctan(Q/L) \quad (2)$$

$$\theta < \{90° + \arctan(T-Q)/(P/2)\}/2 \quad (3)$$

EFFECT OF THE INVENTION

The planar light source of the present invention achieves high average luminance and little luminance unevenness.

BEST MODE(S) FOR CARRYING OUT THE INVENTION

Figure 1:
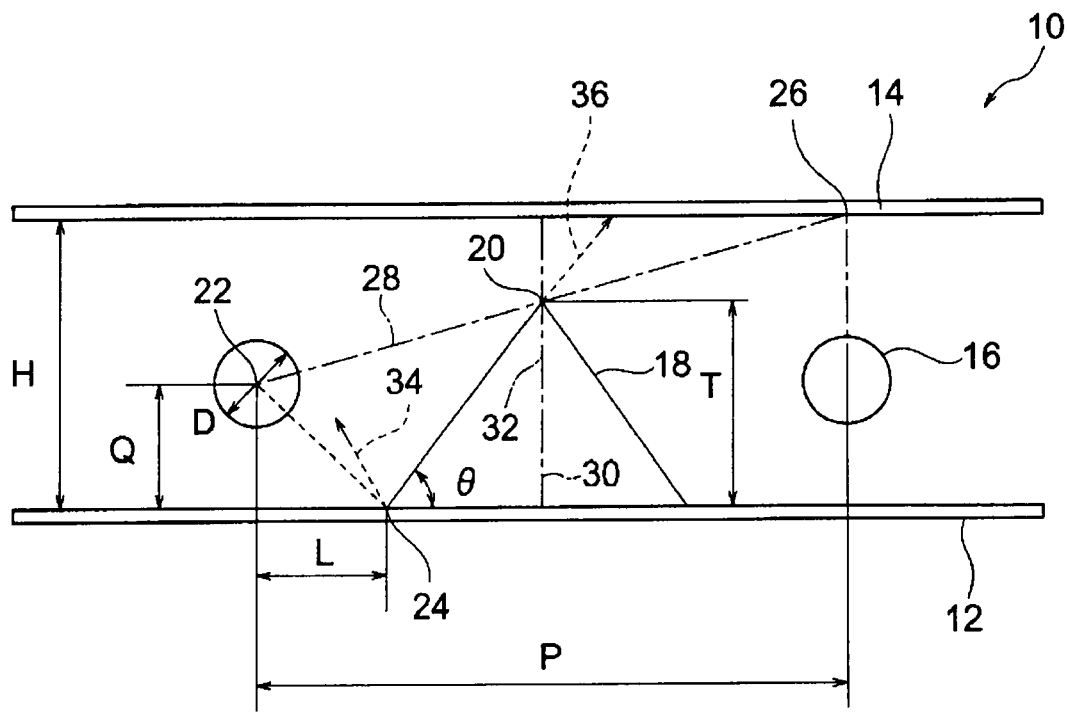
FIG. 1 is a schematic diagram of a planar light source according to an embodiment of the present invention.

An embodiment of the present invention will be described below with reference to the drawings. However, the present invention is not limited to the examples described hereafter. FIG. 1 is a schematic diagram of a planar light source according to an embodiment of the present invention. In a planar light source 10 of the example, a plurality of linear light sources (cold cathode ray tubes) 16 are arranged in parallel and equal distances apart between a reflector 12 and a diffuser 14. The reflector 12 and the diffuser 14 are disposed in parallel. A reflective chevronwise partition plate 18 is provided between adjacent linear light sources 16, such as to project in a shape of a chevron from the reflector 12. The chevronwise partition plate 18 can be integrally formed with the reflector 12. Alternatively, the chevronwise partition plate 18 can be mechanically joined with the reflector 12 or fixed onto the reflector 12 by an adhesive or the like.

In the planar light source of the present invention, following conditions (1) to (3) are met when a vertical distance from the reflector 12 to a peak section 20 of the chevronwise partition plate 18 is T, a vertical distance from the reflector 12 to a center 22 of a linear light source 16 is Q, a vertical distance from the reflector 12 to the diffuser 14 is H, a horizontal distance from the center 22 of the linear light source 16 to a foot section 24 of the chevronwise partition plate 18 is L, a horizontal distance between the centers 22 of adjacent linear light sources 16 is P, a diameter of the linear light source 16 is D, and a foot angle of the chevronwise partition plate 18 is θ.

$$T = (H+Q)/2 - D/2 \quad (1)$$

$$\theta < 90° - \arctan(Q/L) \quad (2)$$

$$\theta < \{90° + \arctan(T-Q)/(P/2)\}/2 \quad (3)$$

Condition (1) indicates that the peak section 20 of the chevronwise partition plate 18 is present at a position that is a position 32 or higher. The position 32 is lower than a position at which a line 28 and a center line 30 intersect by a distance that is equal to a radius of the linear light source 16. The line 28 connects the center 22 of the linear light source 16 and a portion 26 of the diffuser 14 directly above the adjacent linear light source 16. The center line 30 runs between the adjacent linear light sources 16. Condition (2) indicates that a reflected light (mirror reflection element) 34 at the foot section 24 of the chevronwise partition plate 18 is not front-projected outside of the center 22 of the linear light source 16. The reflected light 34 is of light from the linear light source 16. Condition (3) indicates that a reflected light (mirror reflection element) 36 at the peak section 20 of the chevronwise partition plate 18 is front-projected outside of the peak section 20 of the chevronwise partition plate 18 (adjacent light source side). The reflected light 36 is of the light from the linear light source 16.

In the planar light source of the example, a height and an angle of a reflective chevronwise partition plate present between light sources meet the conditions (1) to (3). Therefore, a light emitted from a light source is reflected and diffused by a reflector provided directly below the light source. The light is also effectively reflected and diffused by the chevronwise partition plate. As a result, average luminance is enhanced and luminance unevenness is reduced.

In the present invention, a material used to form the reflector and the reflective chevronwise partition plate is not limited. However, a foamed sheet having a diffuse reflectance of 95% or more is preferably used. More preferably, the material is a thermoplastic film or sheet having fine bubbles or pores with a mean bubble diameter equal to a wavelength of the light or more and 50 micrometers or less within. For example, general-purpose resins such as polyethylene, polypropylene, polystyrene, polyvinylchloride, polybiphenylchloride, polyethylene terephthalate and polyvinyl alcohol, engineering plastics such as polycarbonate, polybuthylene terephthalate, polyethylene naphthalate, polyamide, polyacetal, polyphenylene ether, ultra-high molecular weight polyethylene, polysulfone, polyethersulfone, polyphenylenesulfide, polyarlate, polyamideimide, polyetherimide, polyetheretherketone, polyimide, polytetrafluoroethylene, liquid crystal polymer, and fluororesin, or copolymers and mixtures thereof are given as materials for the thermoplastic film or sheet. Among these, polyester such as polyethylene terephthalate and polybuthylene terephthalate, polyphenylenesulfide, polypropylene, and cyclopolyolefin are preferable due to superior heat-resistance and impact-resistance properties and the like. Additives, such as antioxidant, ultraviolet inhibitor, lubricant, pigment, and reinforcement can be added accordingly to the thermoplastic. In addition, a coating layer containing these additives can be applied to and formed on the thermoplastic film or sheet.

More specifically, an example of the foamed sheet is a thermoplastic polyester extrusion sheet that is impregnated with carbon dioxide gas under high pressure and subsequently heated and foamed. A polyester foamed sheet having an internal bubble diameter of 50 micrometers or less (for example, MCPET® manufactured by Furukawa Electric Co., Ltd.) can be used. In addition, a cyclopolyolefin foamed sheet similarly having an internal bubble diameter of 50 micrometers or less can be used.

Another preferred example of the material used to form the reflector and the reflective chevronwise partition plate is a thermoplastic film or sheet containing fillers. A film or sheet in which numerous voids are formed with the fillers serving as cores is given as the example. In this case, the thermoplastic film or sheet containing fillers is preferably a porous stretched film or sheet in which numerous voids are formed with the fillers serving as the cores by forming an un-stretched film or sheet containing fillers and stretching this un-stretched film or sheet.

In the present invention, a thickness of the foamed sheet forming the reflector and the reflective chevronwise partition plate is preferably 200 to 2000 micrometers. When the thickness of the above-described foamed sheet is within a range of 200 to 2000 micrometers, the foamed sheet has rigidity and is therefore a preferable foamed sheet. A specific gravity of the foamed sheet is preferably 0.1 to 0.7. Moreover, the reflector and the reflective chevronwise partition plate can be formed by a metal plate to which the above-described film or sheet is appropriately adhered.

In the present invention, the diffuse reflectance refers to a ratio of a diffuse reflected beam to an incident beam of the light. The diffuse reflectance is measured by a recording spectrophotometer at a wavelength range of 400 to 1200 nanometers. The diffuse reflectance of a white board that is hardened finely-powdered barium sulfate is 100%, and the diffuse reflectance is a value determined as a relative value thereof. For example, UV-3100PC (Shimazu Corporation product name) can be used as the recording spectrophotometer.

In the present invention, straight fluorescent lamps, cold cathode ray tubes, and the like can be used as the linear light source.

In the present invention, the diffuser can be selected accordingly and used.

EXAMPLES

Next, examples of the planar light source of the present invention will be described. However, the present invention is not limited to the examples described hereafter.

Examples and Comparative Examples 1 to 4

Planar light sources configured as shown in FIG. 1 and having the dimensions shown in Table 1 are manufactured. An example 1 and an example 2 meet all conditions (1) to (3). A comparative example 1 meets only the conditions (1) and (3). A comparative example 2 meets only the conditions (1) and (2). A comparative example 3 meets only the conditions (2) and (3). A planar light source that is the same as the example 1 aside from the chevronwise partition plate not being provided between adjacent fluorescent lights is manufactured as a comparative example 4.

In the examples and the comparative examples, a polyethylene terephthalate plastic foam (Furukawa Electric Co., Ltd. product name: MCPET; thickness of 1 millimeter, specific gravity of 0.325, and diffuse reflectance of 96.0% at 550 nanometers) having fine bubbles with a mean bubble diameter of 10 micrometers is used for the reflector and the reflective chevronwise partition plate.

Figure 2:
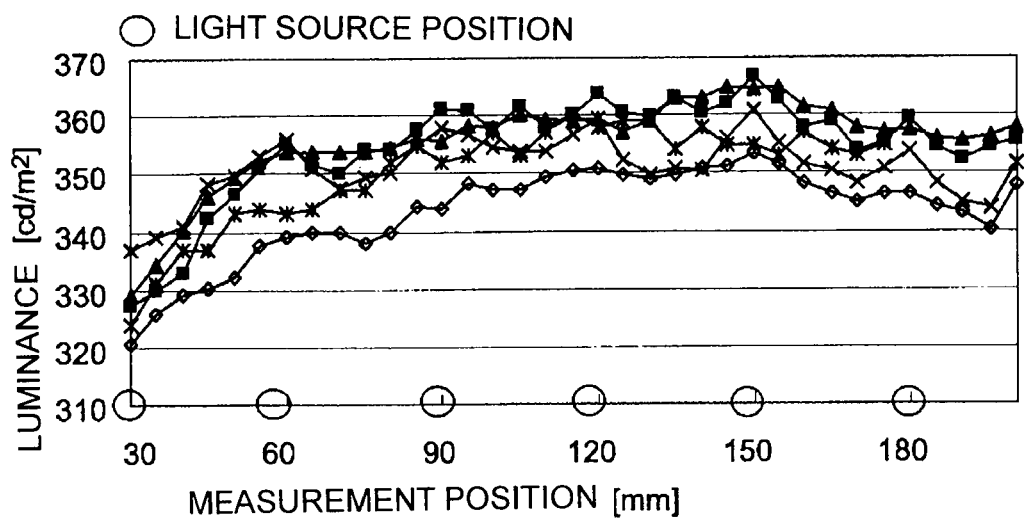
FIG. 2 is a graph showing luminance measurement results for planar light sources of examples and comparative examples.
Figure 3:
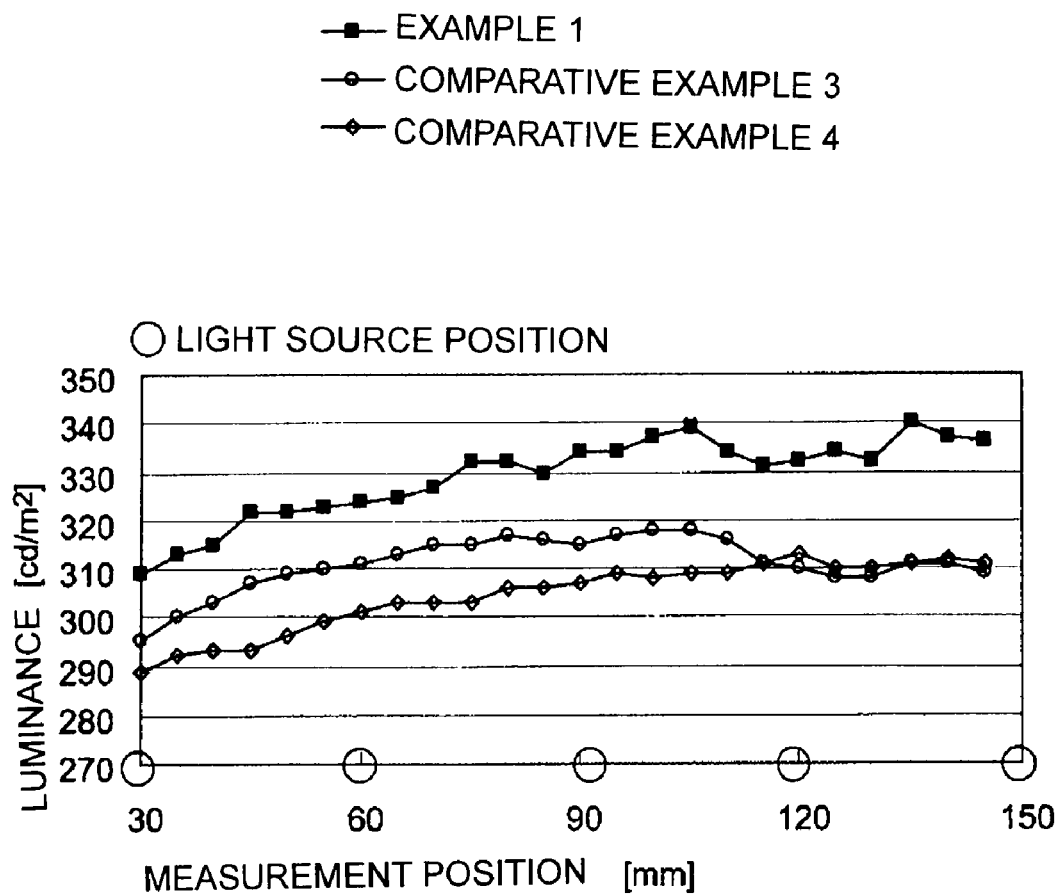
FIG. 3 is a graph showing luminance measurement results for planar light sources of examples and of comparative examples.

Next, the planar light sources of the examples and the comparative examples are set within a liquid crystal television. Luminance ($cd/m^2$) is measured using a digital luminance meter (BM-9 manufactured by TOPCON Corporation) and a digital luminance meter photodetector (BM-910D by TOPCON Corporation). Results are shown in FIG. 2 and FIG. 3. It is clear from FIG. 2 and FIG. 3 that the planar light sources of the examples have higher average luminance and less luminance unevenness than the planar light sources of the comparative examples.

The invention claimed is:

1. A planar light source, comprising:
   a plurality of linear light sources arranged in parallel between a reflector and a diffuser that are disposed in parallel; and
   a reflective chevronwise partition plate provided between adjacent linear light sources to project in a shape of a chevron from the reflector, wherein,
   when a vertical distance from the reflector to a peak section of the chevronwise partition plate is T, a vertical distance from the reflector to a center of a linear light source is Q, a vertical distance from the reflector to the diffuser is H, a horizontal distance from the center of the linear light source to a foot section of the chevronwise partition plate is L, a horizontal distance between the centers of adjacent linear light sources is P, a diameter of the linear light source is D, and a foot angle of the chevronwise partition plate is $\theta$, the following conditions (1), (2), and (3) are met:

$$T=(H+Q)/2-D/2 \tag{1}$$

$$\theta<90°-\arctan(Q/L) \tag{2}$$

$$\theta<\{90°+\arctan(T-Q)/(P/2)\}/2 \tag{3}.$$

2. The planar light source according to claim 1, wherein the reflector and the chevronwise partition plate are formed from a foamed sheet having a diffuse reflectance of 95% or more.

3. The planar light source according to claim 2, wherein the foamed sheet is formed from a thermoplastic having fine bubbles or pores with a mean bubble diameter from a length equal to a wavelength of a light to 50 micrometers within.

* * * * *